(12) United States Patent
Lu

(10) Patent No.: US 10,555,285 B2
(45) Date of Patent: *Feb. 4, 2020

(54) NETWORK SERVICE EXPOSURE METHOD AND APPARATUS UTILIZING THE SAME

(71) Applicant: CLOUD NETWORK TECHNOLOGY SINGAPORE PTE. LTD., Singapore (SG)

(72) Inventor: Chi-Chang Lu, New Taipei (TW)

(73) Assignee: Cloud Network Technology Singapore Pte. Ltd., Singapore (SG)

(*) Notice: Subject to any disclaimer, the term of this patent is extended or adjusted under 35 U.S.C. 154(b) by 0 days.

This patent is subject to a terminal disclaimer.

(21) Appl. No.: 16/391,750

(22) Filed: Apr. 23, 2019

(65) Prior Publication Data
US 2019/0254016 A1 Aug. 15, 2019

Related U.S. Application Data

(63) Continuation of application No. 15/626,158, filed on Jun. 18, 2017, now Pat. No. 10,368,340, which is a
(Continued)

(30) Foreign Application Priority Data

Apr. 1, 2010 (CN) .......................... 2010 1 0137400

(51) Int. Cl.
*H04N 5/76* (2006.01)
*H04W 72/04* (2009.01)
(Continued)

(52) U.S. Cl.
CPC .......... *H04W 72/0406* (2013.01); *H04N 5/76* (2013.01); *H04N 21/4131* (2013.01); *H04N 21/44231* (2013.01); *H04N 21/4524* (2013.01); *H04N 21/6543* (2013.01); *H04N 21/6582* (2013.01); *H04W 4/70* (2018.02); *H04W 24/08* (2013.01); *H04W 8/10* (2013.01); *H04W 88/02* (2013.01); *H04W 88/16* (2013.01)

(58) Field of Classification Search
None
See application file for complete search history.

(56) References Cited

U.S. PATENT DOCUMENTS 9,717,074 B2 * 7/2017 Lu ........................... H04W 4/70
2005/0026567 A1 * 2/2005 Austin ................... H04W 16/18
455/67.11
(Continued)

*Primary Examiner* — Eileen M Adams
(74) *Attorney, Agent, or Firm* — ScienBiziP, P.C.

(57) ABSTRACT

A machine type communication (MTC) gateway device is operable to provide usage type information to a 3GPP network entity and an application out of the 3GPP network. The disclosed MTC gateway device and base station provide an enhanced monitoring response with an enhanced positioning granularity to a position monitoring request. Exposure of usage type and subscription information associated with a user equipment (UE) device is a first step to virtual network function and network slice related provisioning and dedicated core network related provisioning for the UE device. Providing UE usage type through a network exposure function to a third party application enables the third party application to adapt for the usage type.

4 Claims, 6 Drawing Sheets

Related U.S. Application Data continuation-in-part of application No. 14/919,016, filed on Oct. 21, 2015, now Pat. No. 9,717,074, which is a continuation-in-part of application No. 14/591,004, filed on Jan. 7, 2015, now Pat. No. 9,204,192, which is a continuation of application No. 13/585,778, filed on Aug. 14, 2012, now Pat. No. 8,958,683, which is a continuation of application No. 12/770,733, filed on Apr. 30, 2010, now Pat. No. 8,270,821.

(51) Int. Cl.

| | | |
|---|---|---|
| *H04W 24/08* | (2009.01) | |
| *H04W 4/70* | (2018.01) | |
| *H04N 21/41* | (2011.01) | |
| *H04N 21/442* | (2011.01) | |
| *H04N 21/45* | (2011.01) | |
| *H04N 21/6543* | (2011.01) | |
| *H04N 21/658* | (2011.01) | |
| *H04W 88/02* | (2009.01) | |
| *H04W 88/16* | (2009.01) | |
| *H04W 8/10* | (2009.01) | |

(56) References Cited

U.S. PATENT DOCUMENTS

| | | | | |
|---|---|---|---|---|
| 2011/0184187 A1* | 7/2011 | Sedelmeier | ......... | C07D 257/04 |
| | | | | 548/252 |
| 2011/0184871 A1* | 7/2011 | Stahl | ............ | G06Q 10/06 |
| | | | | 705/310 |
| 2011/0195720 A1* | 8/2011 | Han | ............ | H04B 7/2606 |
| | | | | 455/450 |
| 2011/0274040 A1* | 11/2011 | Pani | ............ | H04W 4/70 |
| | | | | 370/328 |

\* cited by examiner

NETWORK SERVICE EXPOSURE METHOD AND APPARATUS UTILIZING THE SAME

CROSS-REFERENCE TO RELATED APPLICATIONS

This application is a continuation of U.S. application Ser. No. 15/626,158, entitled "NETWORK SERVICE EXPOSURE METHOD AND APPARATUS UTILIZING THE SAME" filed on Jun. 18, 2017, published as US 20170311304 A1, which is a continuation in part of U.S. application Ser. No. 14/919,016, entitled "MACHINE TYPE COMMUNICATION DEVICE AND MONITORING METHOD THEREOF," filed on Oct. 21, 2015, published as US 20160044651 A1, which is a continuation in part of U.S. application Ser. No. 14/591,004, entitled "PORTABLE ELECTRONIC DEVICE WITH DIVERSIFIED OPERATION METHOD," filed on Jan. 7, 2015, published as US 20150125129 A1, issued as U.S. Pat. No. 9,204,192 on Dec. 1, 2015, which is a continuation of U.S. application Ser. No. 13/585,778, entitled "PORTABLE ELECTRONIC DEVICE AND DIVERSIFIED OPERATION METHOD THEREOF," filed on Aug. 14, 2012, published as US 20120308197 A1, issued as U.S. Pat. No. 8,958,683 on Feb. 17, 2015, which is a continuation of U.S. application Ser. No. 12/770,733, entitled "MEDIA DATA PLAYBACK DEVICE AND REPLAY METHOD THEREOF," filed on Apr. 30, 2010, published as US 20110243522 A1, issued as U.S. Pat. No. 8,270,821 on Sep. 18, 2012, which is based upon and claims the benefit of priority from Chinese Patent Application No. 201010137400.9, filed Apr. 1, 2010 in the People's Republic of China. The entirety of each of the above-mentioned patent applications is hereby incorporated by reference herein.

FIELD

The disclosure relates to computer technologies, and more particularly to a network service exposure method thereof.

BACKGROUND

A machine type communication (MTC) device is a kind of user equipment (UE) device which is equipped for machine type communication, and communicates through a public land mobile network (PLMN) with MTC server(s) and/or other MTC device(s). With a wide range of potential applications, MTC or machine to machine (M2M) communication is gaining a tremendous interest and attracting more and more research investment among mobile network operators, equipment vendors, MTC specialist companies, and research bodies. To facilitate convergence among these different stakeholders, different standardization groups started working on MTC.

5G system may be an evolution or a revolution of the whole cellular network including UE, access network, and core network, such as PLMN.

DETAILED DESCRIPTION

Descriptions of exemplary embodiments of an MTC device and monitoring method thereof are given in the following paragraphs which are organized as follows:
1. System Overview
   1.1 Exemplary MTC Device
2. Exemplary operations of the MTC device
3. Location Monitoring and Location Reporting
4. Positioning Method
5. Exposure of Enhanced Monitoring Functions Through SCEF
6. Conclusion Note that although terminology from 3rd Generation Partnership Project (3GPP) long term evolution (LTE) has been used in this disclosure to exemplify the devices, network entities, interfaces and interactions between the entities, this should not be seen as limiting the scope of the disclosure to only the aforementioned system. Other wireless systems, including global system for mobile (GSM), wideband code division multiple access (W-CDMA), Institute of Electrical and Electronics Engineers (IEEE) 802.16, and low power wide area network (LPWAN), may also benefit from exploiting the ideas covered within the disclosure.

1. System Overview

Figure 1:
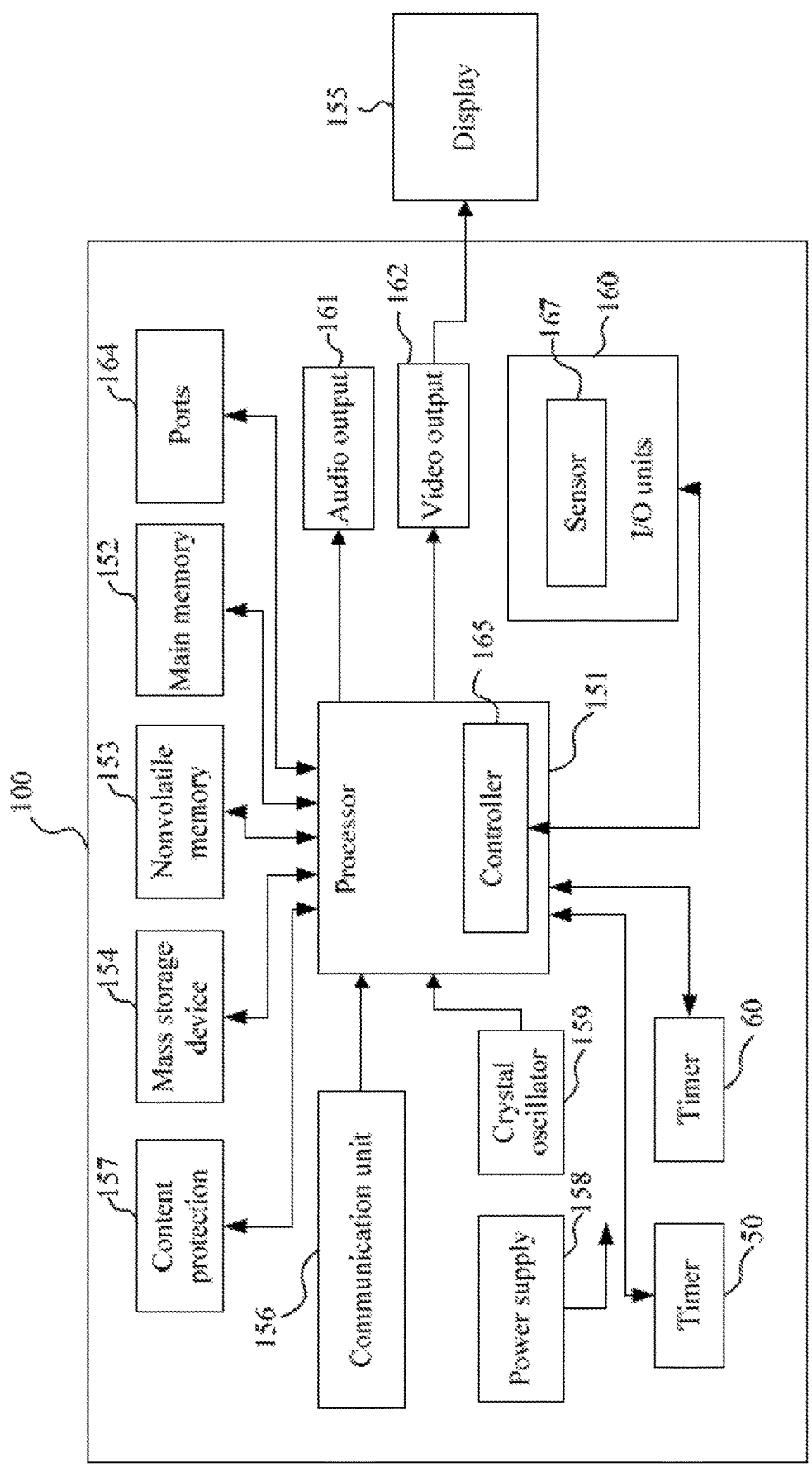
FIG. 1 is a block diagram of an exemplary embodiment of a MTC device.

With reference to FIG. 1, an electronic device 100 is described in the following as an example of an MTC device. The electronic device 100 may be an MTC gateway device. An exemplary definition of an MTC gateway device is provided in 3GPP technical report (TR) 22.888. An MTC gateway device is an MTC device equipped for machine type communication, which acts as a gateway for a group of co-located MTC devices. An MTC gateway device may connect MTC devices and/or local access devices in an MTC capillary network served by the MTC gateway device to communicate through a PLMN with one or more MTC server, and/or other one or more MTC Device. A local access device is a device in an MTC capillary network, which has no 3GPP mobile communication capability. A local UE devices, such as an MTC device connecting to a relay UE, such as an MTC gateway, through a sidelink may be referred to as remote UE device. An MTC capillary network is a network of devices that provides local connectivity between devices within coverage of a MTC gateway device. Examples of the MTC capillary network may comprise 3GPP proximity-based services (ProSe) sidelinks, wireless local area network (WLAN) protocols, such as IEEE 802.11 networks, and personal area network (PAN), such as IEEE 802.15 networks. 3GPP ProSe sidelink is referred to as PC5 in 3GPP TS 23.303. An MTC gateway device performs procedures such as authentication, authorization, registration, management and provisioning for the local access devices connected to the MTC gateway device through local connectivity. The provisioning may comprises but not limited to allocating Internet protocol (IP) addresses to local access devices and remote UE devices.

The disclosed MTC device 100 can be implemented as a stand-alone device or integrated in various MTC devices, such as a set top box, a cell phone, a tablet personal computer (PC), a laptop computer, a monitor, a multimedia player, a digital camera, a personal digital assistant (PDA), a navigation device or a mobile internet device (MID).

1.1 Exemplary MTC Device

With reference to FIG. 1, a processor 151 comprises a central processing unit of the MTC device 100. The processor 151 may comprise various integrated circuits (ICs) for processing data and machine-readable instructions. Connection of the components in the device 100 is shown in FIG. 1 and may comprise serial or parallel transmission buses, or wireless communication channels. A communication unit 156 establishes a first set of one or more wireless communication channels, referred to as backbone wireless channel, through which the device 100 may connect through a PLMN to a packet data network (PDN), such as the Internet. The communication unit 156 may receive data, such as media data streams, and receive signaling, such as monitoring requests, from a remote station on the Internet. The device 100 may connect to the Internet through a PLMN or a LPWAN. Additionally, the communication unit 156 may establish a second set of one or more wireless communication channels, referred to as capillary wireless channel, through which a portable device, such as a remote control, a local access device, a mobile phone, or a palm top computer, may connect to and exchange data with the device 100. An example of the capillary wireless channel may comprise 3GPP ProSe UE-to-UE connection or device to device (D2D) connection, referred to as sidelink. The communication unit 156 may comprise antennas, base band, radio frequency (RF) chipsets, and interconnecting circuitry for the established wireless communication channels. Examples of the capillary wireless channels may be channels conforming to 3GPP ProSe direct communication, wireless local area network (WLAN) protocols and/or personal area network (PAN) protocols. Examples of the backbone wireless channels may be channels conforming to cellular communication such as W-CDMA, high speed downlink packet access (HSDPA), LTE, LTE-Advance, and other beyond 4G communication technologies. The beyond 4G communication technologies may be referred to as 5G technology, such as IMT-2020 technology named by International Telecommunication Union (ITU). Through the established wireless communication channels, the device 100 may serve as a MTC gateway device, a relay UE device, a wireless LAN access point, or hotspot through which the portable device connected with the device 100 connects to the Internet. The device 100 comprises an interface operable to convert signals and data packets transferred between the backbone wireless channel and a capillary wireless channel. The device 100 may function as an MTC gateway device connecting a plurality of devices through the capillary wireless channels to form an MTC capillary network. A relay UE device, such as ProSe UE-to-UE relay or ProSe UE-to-Network relay may serve as an MTC gateway device. An MTC gateway device may also serve as a relay UE device. Examples of a relay UE device is disclosed in U.S. patent application Ser. No. 15/439,944 entitled "RELAY USER EQUIPMENT DEVICE AND CAPABILITY DISCOVERY METHOD THEREOF." Examples of the backbone wireless channels may comprise wireless backhaul connections described in U.S. patent application Ser. No. 15/439,944. The entirety of the U.S. patent application Ser. No. 15/439,944 is incorporated by reference herein.

The processor 151 may be packaged as a chip or comprise a plurality of chips interconnected through buses. For example, the processor 151 may only comprise a central processing unit (CPU) or a combination of a CPU, a digital signal processor (DSP), and a communication controller chip, such as a chip of the communication unit 156. The communication controller may comprise one or more controllers of wired or wireless communication, such as for cellular, infrared, Bluetooth™, or wireless local area network (LAN) communication. The communication controller coordinates communication among components of the device 100 or communication between the device 100 and external devices.

A power supply 158 provides electrical power to components of the device 100. For example, the power supply 158 may comprise a rectifier, a battery, or a renewable power supply which harvests electrical power from environment. A crystal oscillator 159 provides clock signals to the processor 151 and other components of the device 100. The timers 50 and 60 keep track of predetermined time intervals and may comprise processing circuits, machine-readable programs, or a combination thereof. Each of the timers 50 and 60 generates signals to give notification of expiration of the predetermined time intervals. Input and output (I/O) units 160 may comprise control buttons, an alphanumeric keypad, a touch panel, a touch screen, and a plurality of light emitting diodes (LEDs). A controller 165 detects operations on the I/O units 160 and transmits signals indicative of the detected operation to the processor 151. The controller 165 also controls operations of the I/O units 160. The processor 151 may control the I/O units 160 through the controller 165. Ports 164 may be used to connect to various computerized interfaces, such as an external computer, or a peripheral device. The ports 164 may comprise physical ports complying with universal serial bus (USB) and IEEE 1394 standards, recommended standard 232 (RS-232) and/or recommended standard 11 (RS-11) defined by Electronics Industries Association (EIA), serial ATA (SATA), and/or high-definition multimedia interface (HDMI).

Nonvolatile memory 153 stores an operating system and applications executable by the processor 151. The processor 151 may load runtime processes and data from the nonvolatile memory 153 to the main memory 152 and store digital content in a mass storage device 154. The device 100 may obtain digital content such as e-books through the communication unit 156. The main memory 152 may comprise a random access memory (RAM), such as static RAM (SRAM) or dynamic RAM (DRAM). The main memory 152 may comprise a nonvolatile random access memory (NVRAM), such as phase-change random access memory (PRAM), magnetoresistive random access memory (MRAM), or other NVRAM. Some examples of NVRAM comprise ferroelectric RAM, resistive RAM, organic bistable memory material. One example of MRAM is spin-transfer torque magnetic random access memory (STT-MRAM). The nonvolatile memory 153 may comprise an electrically erasable programmable read-only memory (EEPROM) or a flash memory, such as a NOR flash or a NAND flash, or a NVRAM.

A content protection system 157 provides access control to digital content reproduced by the device 100. The content protection system 157 may comprise memory and necessary devices for implementing digital video broadcasting-common interface (DVB-CI) and/or conditional access (CA).

The device 100 may obtain digital content from broadcast signals through an antenna, a tuner, and a demodulator. Alternatively, the device 100 may obtain digital content from an information network, such as the Internet, through a network interface. For example, the device 100 may receive broadcast signals through multimedia broadcast multicast services (MBMS) and broadcast services of 5G system.

A video output unit 162 comprises filters and amplifiers for filtering and amplifying video signals output by the processor 151. An audio output unit 161 comprises a digital to analog converter converting audio signals output by the processor 151 from digital format to analog format.

A display 155 is operable to display text and images, and may comprise e-paper, organic light emitting diodes (OLED), a field emission display (FED), or a liquid crystal display (LCD). Alternatively, the display 155 may comprise a reflective display, such as an electrophoretic display, an electrofluidic display, or a display using interferometric modulation. The display 155 may display various graphical user interfaces (GUIs) as virtual controls including but not limited to windows, scroll bars, icons, and clipboards. The display 155 may comprise a single display or a plurality of displays in different sizes. The processor 151 may present various GUIs on the display 155 as detailed in the following paragraphs.

The I/O units 160 comprise a touch sensor 167 operable to detect touch operations on the display 155. The touch sensor 167 may comprise a transparent touch pad overlaid on the display 155 or arrays of optical touch transmitters and receivers located on the boarder of the display 155, such as those disclosed in US patent publication No. 20090189878.

2. Exemplary Operations of the MTC Device

The communication unit 156 of the device 100 may communicate with and download some useful information such as location, weather, entertainment, media data streams and flight information from an MTC Server. Alternatively, the communication unit 156 may communicate with and receive media data streams such as surveillance images from an MTC device, such as a surveillance camera, a motion sensor, a fire alarm, a thermal meter, in the capillary network of the MTC gateway device. Another MTC device may connect to the MTC gateway device and fetch the information directly from the MTC gateway device.

U.S. Pat. No. 8,958,683 and U.S. application Ser. No. 14/591,004 entitled "PORTABLE ELECTRONIC DEVICE WITH DIVERSIFIED OPERATION METHOD," filed on Jan. 7, 2015, published as US 20150125129 A1 disclose diversified operation methods and playback positioning methods. For example, the device 100 may execute the playback positioning methods on a received media data stream.

A MTC device 100a is an embodiment of the device 100. The device 100a may include all the components or only a portion of the components of the device 100. Note that a class of MTC device known as low cost MTC device is still under standardization process led by some standardization groups, such as 3GPP. For example, the device 100a may exclude some of the components of the device 100, such as content protection system 157, the video output 162, the audio output 161, the display 155 and the I/O units 160, and exclude some functions of the device 100, such as the media playback function. The disclosed methods and steps may be executed by or through interoperation of one or more processing units of device 100a, such as the processor 151 and the communication unit 156 and one or more processing units of a 3GPP network entity interacting with the device 100a. The disclosed methods and steps may be soft coded as computer executable programs in programming language or hard coded in IC chips. For example, a status reporter operable to report an active operating state of the device 100a may comprise a processing unit of the device 100a and a portion of computer executable programs executed by the processing unit. Similarly, a monitor request responder operable to responding a monitoring request may comprise a processing unit of the device 100a and a portion of computer executable programs executed by the processing unit.

3. Location Monitoring and Location Reporting

A usage type of the device 100a may be defined into at least two categories: a regular terminal device or an MTC gateway device. The usage type of the device 100a represent an active operating state of the communication unit 156 or the device 100a. When operating in the usage type of MTC gateway device, the device 100a functions as an MTC gateway device wherein the communication unit 156 establishes both of the backbone wireless channel and the capillary wireless channel. When operating in the usage type of regular terminal device, the device 100a does not function as an MTC gateway device wherein the communication unit 156 establishes a wireless communication channel, such as the backbone wireless channel, to a PLMN (s) rather than the capillary wireless channel. The device 100a may be statically associated with one of the two usage type categories. The usage type of the device 100a may be associated with a subscription store in a home subscriber server (HSS), or in a unified data management (UDM) defined in 3GPP TS 23.501. Alternatively, the device 100a may be designed as a multifunctional device which is operable to transit from one of the usage type categories to the other during operation of the device 100a. The processor 151 may transits the usage type of the device 100a in response to user operation on a user interface, or through a network assisted function, such as a device to device (D2D) coordinator selection assignment. For example, the device 100a transits the usage type from an original usage type, such as the regular MTC terminal, to the usage type of MTC gateway device in response a D2D coordinator selection assignment received from a 3GPP network entity. UE usage type has been defined in 3GPP TR 23.799 as the basic information for connecting a UE device, such as the device 100, to at least one network slice instance (NSI). For example, a slice selection function (SSF) may utilize UE usage type of the device 100a to create a NSI to serve the device 100a, and delete the NSI. The SSF may utilize UE usage type of the device 100a to add more NSIs to serve the device 100a and delete NSIs serving the device 100a. The SSF may utilize UE usage type of the device 100a to add and delete a virtual network function (VNF) to a NSI serving the device 100a. Similarly, an external application or a third party application may utilize UE usage type of the device 100a to create a NSI to serve the device 100a, and delete the NSI. The application may utilize UE usage type of the device 100a to add more NSIs to serve the device 100a and delete NSIs serving the device 100a. The application may utilize UE usage type of the device 100a to add and delete a virtual network function (VNF) to a NSI serving the device 100a. In 3GPP TR 23.707, UE usage type may be the basic information for connecting a UE device, such as the device 100a, to a dedicated core network (DCN). Exposure of the UE usage type of a device, such as the device 100a, to an external application, such as a trusted or third party application, through a network exposure function, such as SCEF, allows the external application to create, add, and delete NSIs serving the device.

The category of regular terminal device may comprise subcategories of MTC device, or human to human (H2H) device. Each of the two categories may additionally comprise a plurality of subcategories of usage types, such as high latency MTC and low latency or latency critical MTC, such ultra reliable and low latency communication (URLLC). Accordingly, UE usage type of a device, such as the device 100, may be categorized based on latency related time pattern of data transfer associated with the device.

Figure 2:
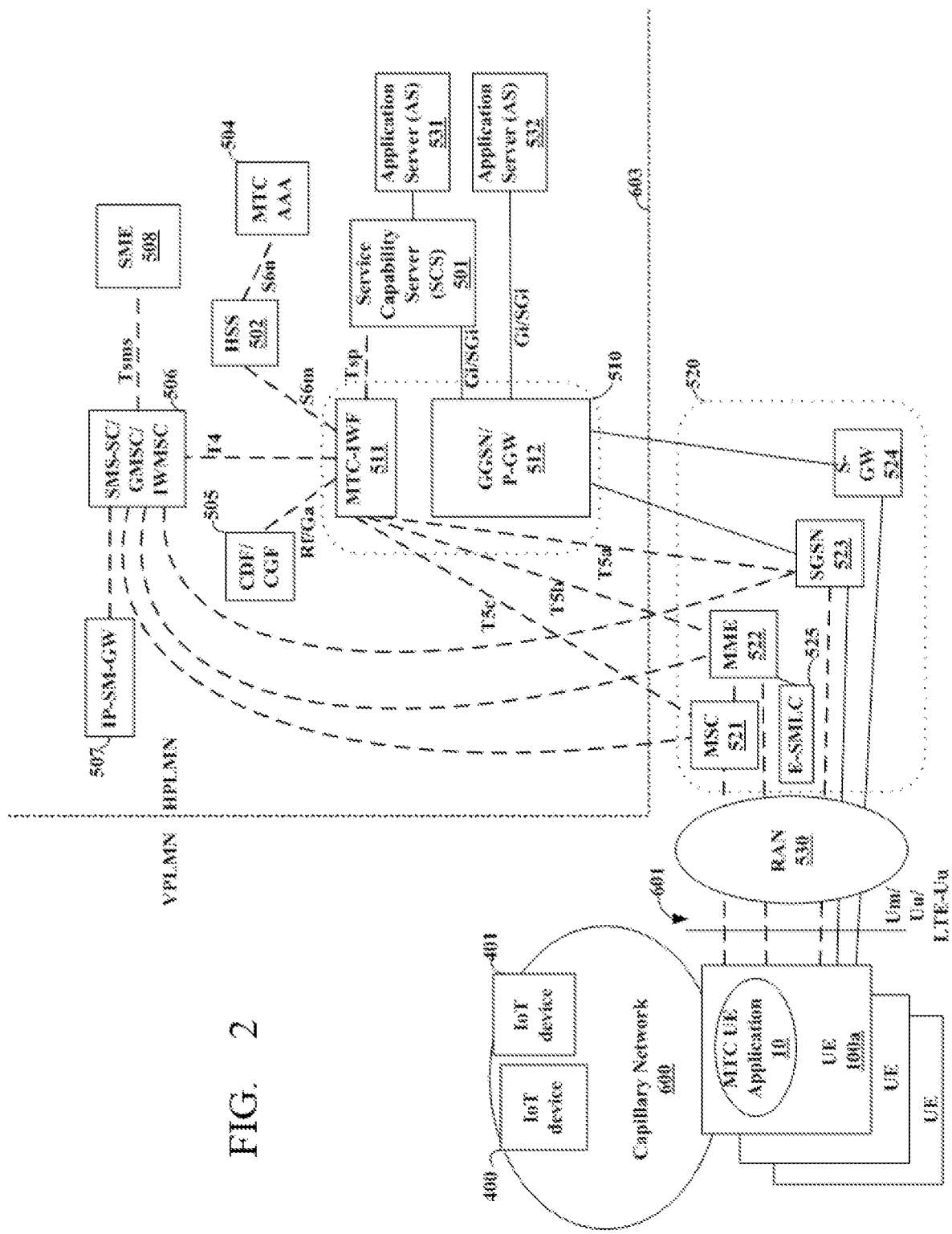
FIG. 2 is a schematic diagram showing an exemplary wireless cellular communication network.

With reference to FIG. 2, when operating in the usage type of regular terminal device, the device 100a may reports location of the device 100a to an application server, such as an application server 531 which initiating a monitoring request. The application server 31 may initiate a monitoring request through a service capability server (SCS) 501, an anchor network entity 510, a HSS 502, a serving network entity 520, and a radio access network (RAN) 530 to device 100a. The location reporting may be triggered by device 100a or sent by device 100a in response to the monitoring request. When operating in the usage type of MTC gateway device, the device 100a reporting location of the device 100a to the application server 531 may be insufficient to reflect location of one or more local access devices or Internet of things (IoT) device 400 and device 401 in the MTC capillary network 600 served by the device 100a. The usage type of device may be recognizable by or transparent to 3GPP network entities.

In FIG. 2, the anchor network entity 510 may comprise at least one of an MTC interworking function (MTC-IWF) 511 and a gateway general packet radio service (GPRS) support node (GGSN)/packet data network (PDN) gateway (P-GW) 512. The serving network entity 520 may comprise at least one of a mobile switching centre (MSC) 521, a mobile management entity (MME) 522, a serving GPRS support node (SGSN) 523, a serving gateway (S-GW) 524, and an enhanced serving mobile location centre (E-SMLC) 525. A core access and mobility management function (AMF) is a mobile management entity for 5G system which is defined in 3GPP TS 23.501. Example of the initiator of the monitoring request may comprise 5G system network entities, such as an application function (AF), a network exposure function (NEF), a network function repository function (NRF), a AMF, a session management function (SMF), user plane function (UPF), and policy control function (PCF). UE location and subscription profile in a subscription management entity, such as the HSS, and the UDM, is are basic information which should be requested and utilized for selection of a SMF and selection of a UPF. Interfaces Um, Uu, LTE-Uu, T5a, T5b, T5c, Gi, SGi, S6n, S6m, Rf, Ga, Tsp and Tsms are 3GPP defined interfaces. Each of the interfaces accompany a connection, shown as a line or a dashed line in FIG. 2, between two network entities denotes the interface, reference point, or protocol between the two network entities. MTC authentication, authorization and accounting (AAA) 504 connected to the HSS 502 may perform AAA related processes, such as mapping a user equipment (UE) international mobile equipment identity (IMEI) or international mobile subscriber identity (IMSI) to an external identifier of the UE using subscriber information in the HSS. The MTC-IWF 511 connects to a network entity 505 of charging data function (CDF) and charging gateway function (CGF) and a network entity 506 of short message service-service centre (SMS-SC), gateway MSC (GMSC), and interworking MSC (IWMSC). The network entity of SMS-SC/GMSC/IWMSC 506 connects to a network entity of short message entity (SME) 508 and a network entity of IP-short-message-gateway (IP-SM-GW) 507. A line 603 denotes a separation between a home public land mobile network (HPLMN) and visited public land mobile network (VPLMN). The device 100a may connect to RAN 530 through one of a plurality of wireless cellular communication channels 601. The device 100a may connect to a core network, such as an LTE evolved packet core (EPC) or a 5G core, through a non-3GPP interworking function (N3IWF).

If the usage type of device 100a is recognizable by 3GPP network entities, at least one 3GPP network entity, such as the HSS 502, the MTC AAA 504, the anchor network entity 510, or the serving network entity 520, may store or be notified of the usage type of the device 100a in association with an identification (ID) or identifier of the device 100a, including a local ID, such as IMEI, IMSI, and/or an external ID, such as a user name, subscriber or subscription information, recognizable by at least one of the application servers 531 and 532.

Figure 3:
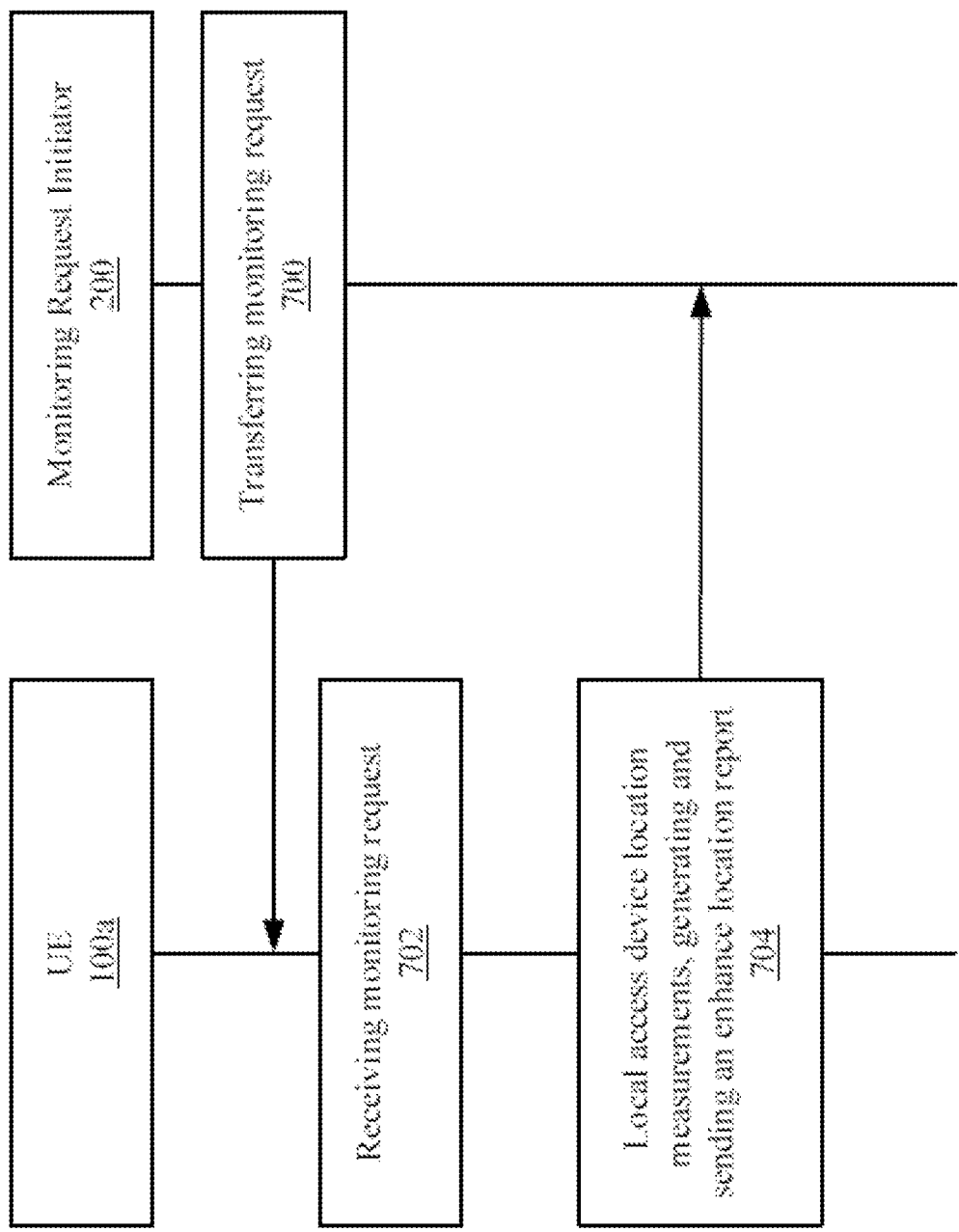
FIG. 3 is a flowchart showing an MTC device transmitting an enhanced monitoring response upon receiving a monitoring request.

With reference to FIG. 3, if device 100a is in the usage type of MTC gateway device, a request initiator 200, such as the serving network entity 520, communicates with the device 100a regarding location measurements of local access devices 400 and 401. For example, the request initiator 200, such as the serving network entity 520, transfers the monitoring request to the device 100a (step 700). The device 100a receives the monitoring request (step 702) and sends an enhanced location report through the serving network entity 520 to an initiator of the monitoring request and/or a destination specified by the monitoring request (step 704). The enhanced location report may comprise the measurements of the locations of the local access devices 400 and 401, the status of the device 100a. The measurements of the locations of the local access devices 400 and 401 may reflect whether each of the device 400 is reachable by the device 100a. The status of the device 100a may reflect whether the device 100a is in the usage type of the regular terminal device or MTC gateway device. The device 100a may perform the measurements in advance or in response to the monitoring request. The device 100a may perform one or more positioning methods, such as positioning methods defined in 3GPP TS 36.305 version 12.2.0, to generate the location measurements of local access devices 400 and 401.

If the usage type of device 100a is transparent to 3GPP network entities, 3GPP network entities do not store the usage type of the device 100a. An MTC UE application 10 may perform the measurements of the locations of the local access devices 400 and 401. The device 100a upon receiving the monitoring request, generates and sends a monitoring response for the monitoring request. The 3GPP network entities and the device 100a may respond the monitoring request according to LTE positioning protocol (LPP) and LTE positioning protocol A (LPPa) or according to clause 5.6.1.5 and clause 5.6.1.1 of 3GPP TS 23.682 version 13.2.0. Additionally, the device 100a sends location measurements of local access devices 400 and 401 to an initiator of the monitoring request and/or a destination specified by the monitoring request. The device 100a may send the location measurements of local access devices 400 and 401 in monitoring response by appending the location measurements of local access devices 400 and 401 after location of the device 100a. Alternatively, the device 100a may send the location measurements of local access devices 400 and 401 in a separated monitoring response to reply to the initiator of the monitoring request and/or the destination specified by the monitoring request. The initiator may be an application server, a service capability exposure function (SCEF), a network exposure function (NEF), an E-SMLC, a location service (LCS) client, or one of the 3GPP network entities. The NEF is an example of SCEF and is defined in 3GPP TS 23.501.

Figure 4:
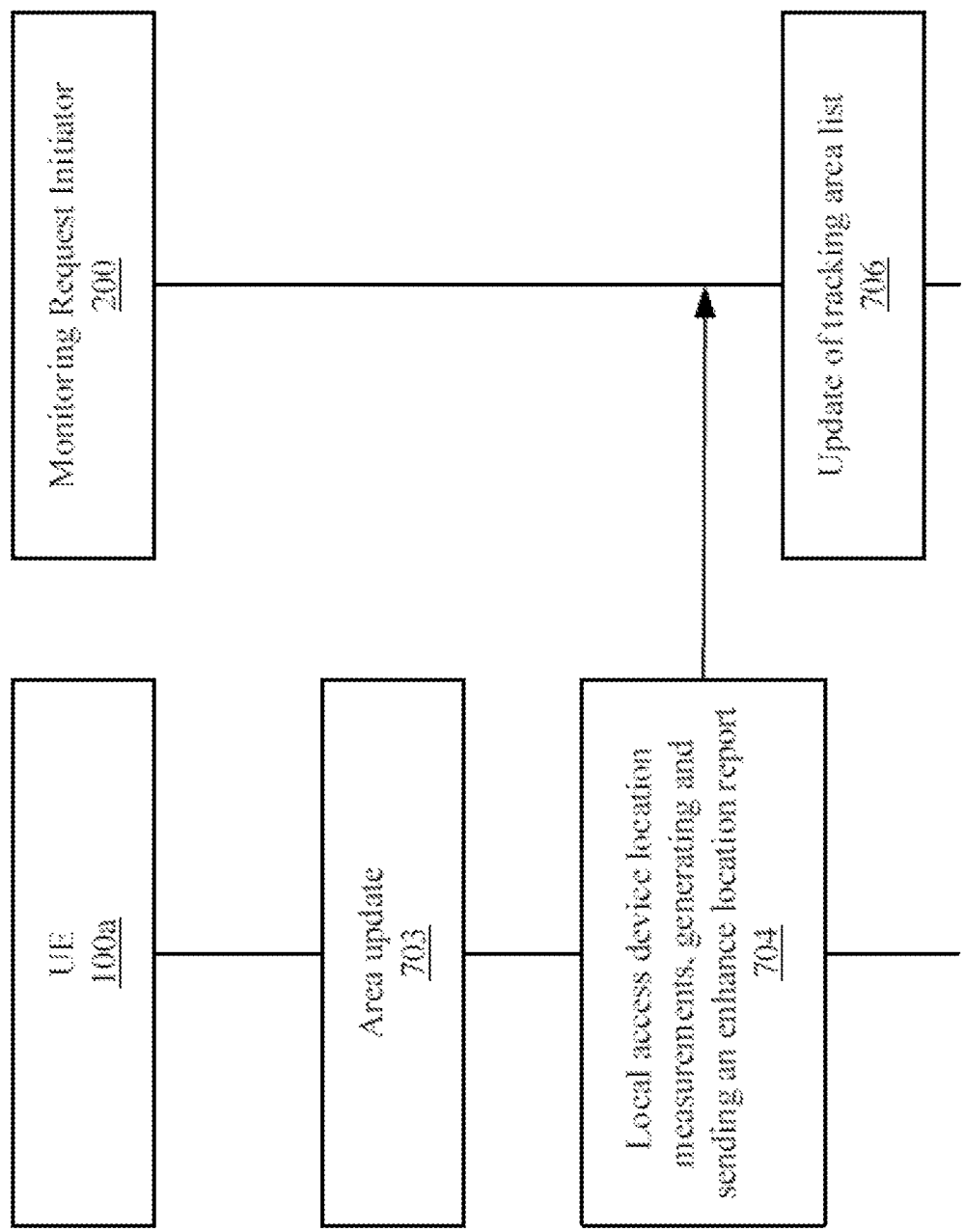
FIG. 4 is a flowchart showing an MTC device transmitting an enhanced monitoring response during an area update process.

With reference to FIG. 4, if device 100a is in the usage type of MTC gateway device, the device 100a performs area update (step 703), such as tracking area update (TAU), location area update (LAU), or routing area update (RAU). The device 100a performs location measurements for the local access devices 400 and 401 and sends the measurements in an enhanced location report through the serving network entity 520 to an initiator of the monitoring request and/or a destination specified by the monitoring request (step 704). The initiator 200, such as serving network entity 520 receives the enhanced location report and updates a tracking area list utilizing the enhanced location report (step 706).

4. Positioning Method

While the terms "pico node" and "macro node" are used extensively in the description, it should be appreciated that the techniques are applicable to any of a variety of transmitting nodes where the coverage area of one transmitting node falls at least partly within the coverage area of another, including deployments in which the coverage area of one node falls entirely with the coverage of another. The terms "pico node" and "macro node" as used herein should be understood to represent examples of base stations. The use of these terms is not meant to rule out the applicability of the disclosure to other nodes and other radio base stations, whether those nodes are called small cells, femtocells, picocells, microcells, femto nodes, micro nodes, NodeB/ eNodB or the similar.

The device 100a may perform one or more of positioning methods, such as positioning methods defined in 3GPP TS 36.305 version 12.2.0, to generate the location measurements of local access devices 400 and 401. The positioning methods may comprise global navigation satellite system (GNSS) positioning methods, downlink positioning methods, enhanced cell ID positioning (E-CID) methods, and uplink positioning methods. One or more local access devices, such as the devices 400 and 401, served by the device 100a in the capillary network 600 may also be MTC devices.

If an MTC device, such as the device 100a or one of devices 400 and 401, is served by a phantom cell or a soft cell formed by linking a plurality of small cells where the phantom cell has at least a portion overlapped with a macro cell served by a macro cell base station. Two small cells in the phantom cell may allocate a same cell-radio network temporary identity (C-RNTI) to the MTC device. The macro cell base station upon receiving the monitoring request replies cell ID of the macro cell base station and cell ID of one or more of the small cell in the phantom cell to the initiator and/or the destination of the monitoring request. The macro cell base station may send the cell ID of the small cell most close to the device 100a or one of devices 400 and 401 in the reply. The cell ID of the macro cell base station may comprise at least one of evolved cell global identifier (ECGI) and physical cell ID. The cell ID of one of the small cells may comprise at least one of evolved cell global identifier (ECGI), physical cell ID, name of home NodeB/ eNodeB (HNB), and ID of Closed Subscriber Group (CSG), or a combination of the IDs.

Figure 5:
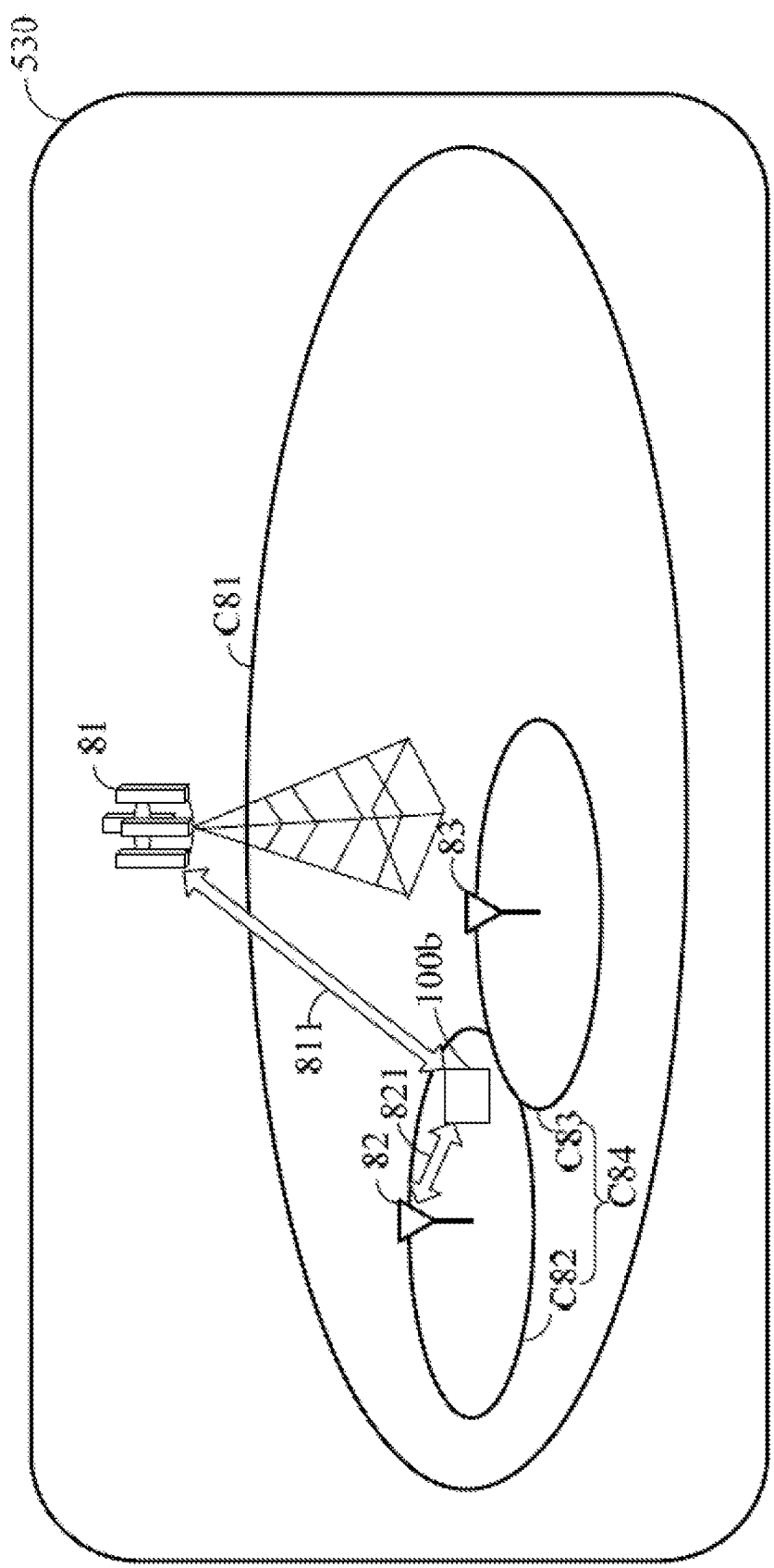
FIG. 5 is a schematic diagram showing an exemplary embodiment of a phantom cell in a radio access network.

With reference to FIG. 5, an MTC device 100b, such as the device 100a or one of devices 400 and 401, is served by a phantom cell C84 formed by linking pico cells C82 and C83. The phantom cell C84 has at least a portion overlapped with a macro cell C81 served by a macro node 81. Pico nodes 82 and 83 serve pico cells C82 and C83 respectively. The macro node 81 serves macro cell C81. The macro node 81 is a base station with higher radio transmission power while the pico nodes 82 and 83 are base stations with lower radio transmission power. An administering node, such as macro node 81 or one of the pico nodes 82 and 83, manages the phantom cell C84 and communicates with 3GPP core network, such as the serving network entity 520 and the anchor network entity 510. In the following, the macro node 81 is described as the administering node for example, while not intended to limit the disclosure. The macro node 81, for example, serves as the administering node. The macro node 81 transmits control plane signals to the device 100b through wireless channel 811, referred to as an anchor carrier, and directs the pico node 82 to transmits user plane data to the device 100b through wireless channel 821, referred to as a booster carrier. The macro node 81 may allocate lower frequency band, such as below 3 GHz, to the anchor carrier and allocate higher frequency band, such as above 3.5 GHz or millimeter wave bands, to the booster carrier. The anchor carrier and the booster carrier constitute multi-connectivity between the RAN 530 and the device 100b. A RAN entity, such as the macro node 81, may configure multi-connectivity between a RAN and a UE device according to service requirement of the UE device, such as the device 100b. The service requirement may comprise at least one or more of service type, subscription profile, RAN slice instance ID, core network slice instance ID, and UE usage type associated with the UE device. In a case the device 100b serving as a relay UE, such as the device 100a in FIG. 2, wireless backhaul connections of the device 100b comprise the multi-connectivity channels. The relay UE device 100b may be further configured to be utilized for radio resource aggregation or multi-connectivity channels for a remote UE device according to service requirements of the remote UE device. Wireless backhaul connections of small cells, such as the pico cells, and relay UE devices, such as device 100a, serving a remote UE device, such as device 400 or 401, may be configured based on service requirements of the remote UE device. Exemplary configuration methods of the wireless backhaul connections based on service requirements of a remote UE device is disclosed in the U.S. patent application Ser. No. 15/439,944.

The macro node 81 upon receiving the monitoring request replies cell ID of the macro cell base station and cell ID of one or more of the pico nodes 82 and 83 in the phantom cell C84 to the initiator and/or the destination of the monitoring request. The macro cell base station may send the cell ID of the pico node 82 most close to the device 100b in the reply. The cell ID of the pico node 82 may comprise at least one of ECGI, physical cell ID, and/or name of the pico node 82.

5. Exposure of Enhanced Monitoring Functions Through SCEF

Figure 6:
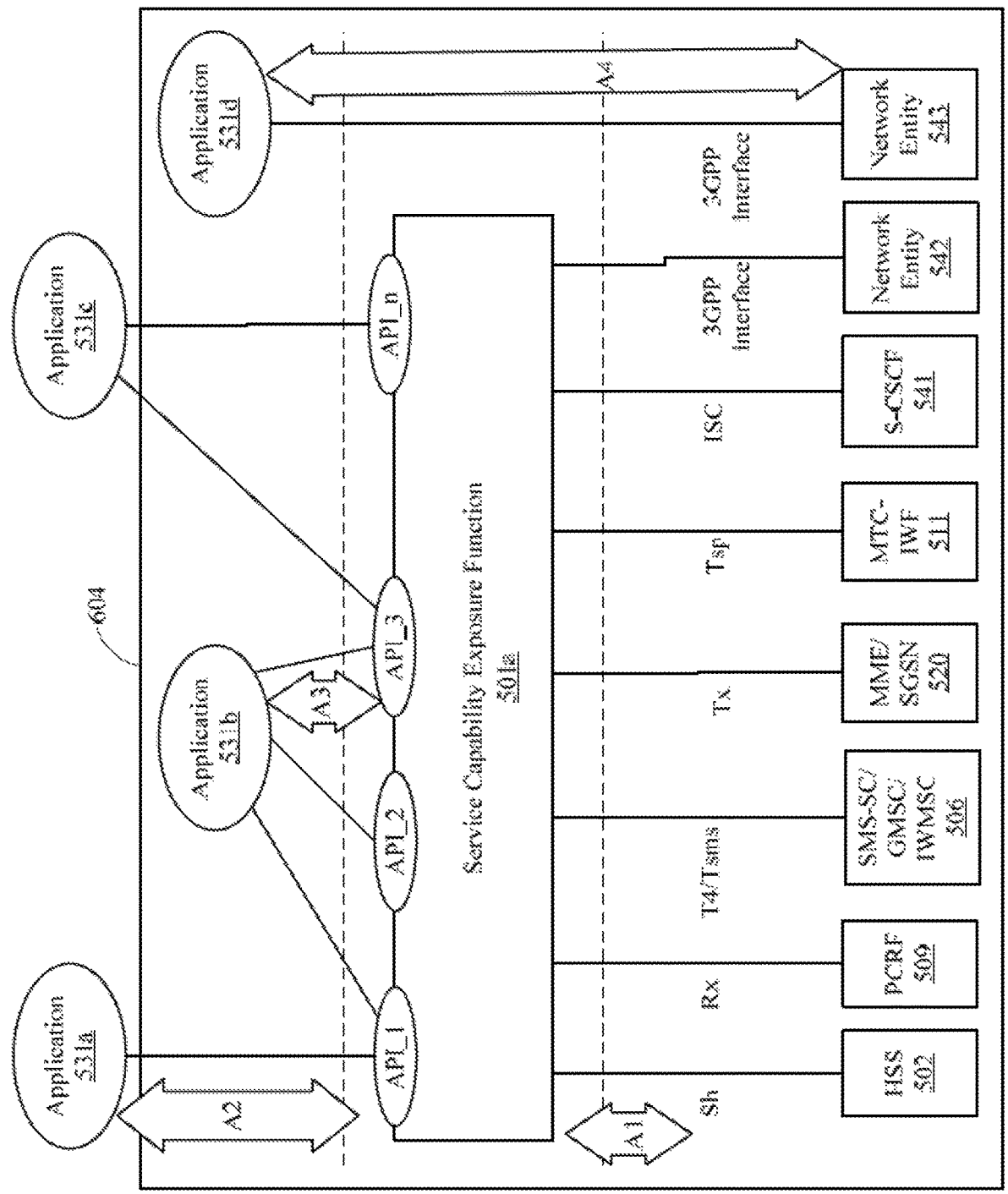
FIG. 6 is a schematic diagram showing an exemplary embodiment of a service capability exposure function (SCEF) providing application programming interfaces (APIs) for enhanced monitoring functions.

With reference to FIG. 6, a SCEF 501a connects to a plurality of 3GPP entities, such as 502, 506, 509, 511, 520, 541, 542, and 543. The network entity 541 is a serving call server control function (S-CSCF) 541. The network entity 509 is a policy and charging rules function (PCRF) 509. Each of interfaces Sh, Rx T4, Tsms, Tsp, ISC, accompany a connection, shown as a line, in FIG. 6, between two network entities denotes the interface, reference point, or protocol between the two network entities. An area 604 is shown as a trust domain of a 3GPP network operator. Each of interfaces A1, A2, A3 and A4 comprises communication protocols between two entities connected by the interface. Each of devices 400 and 401, applications 531a, 531b, 531c, and 531d and the SCS 501 may serve as the initiator of the monitoring request. The SCS 501 may provide the following monitoring functions A, B, and C to application 531a, 531b, and 531c through a SCEF 501a:

TABLE T1

| Monitoring Function | Monitored Entity | Monitored Information |
| --- | --- | --- |
| Function A | MTC Gateway | Usage type |
| Function B | MTC Gateway | Enhanced monitoring response |
| Function C | MTC device | Cell ID of a pico node serving the MTC device in a phantom cell |

For example, the SCS 501 provides application programming interfaces (APIs) for application 531a, 531b, and 531c. The application programming interfaces API_1, API_2, and API_3 respectively activates the monitoring functions A, B, and C. Exposure of the UE usage type of a device, such as the device 100a, to an external application, such as a trusted or a third party application, through a network exposure function, such as SCEF and the SCS 501, allows the external application to create, add, and delete NSIs serving the device. Providing API for a third party application to configure NSIs for a UE is an important feature of future 5G system. The user equipment usage type specifies whether a communication pattern associated with a user identifier of the device belongs to one of human-to-human (H2H) communication and machine-to-machine (M2M) communication. A network entity allows modifying association between the cellular network service subscriber related record and the user identifier of the device. The modification of the association between the cellular network service subscriber related record and the user identifier may comprise transition of the user equipment usage type from H2H communication to M2M communication. Alternatively, the modification of the association between the cellular network service subscriber related record and the user identifier may comprise transition of the user equipment usage type from M2M communication to H2H communication. The cellular network service subscriber related record may comprise latency related time pattern of data transfer associated with the user identifier. The latency related time pattern may specify whether a communication pattern associated with the user identifier belongs to one of latency critical communication and high latency communication. Modification of the association between the cellular network service subscriber related record and the user identifier may comprise transition of the latency related time pattern from the latency critical communication to the high latency communication. Alternatively, modification of the association between the cellular network service subscriber related record and the user identifier may comprise transition of the latency related time pattern from the high latency communication to the latency critical communication. An external application or a third party application, such as one of applications 531a, 531b, 531c, and 531d, and application server 531 and 532, may utilize UE usage type of the device 100a to create a NSI to serve the device 100a, and delete the NSI through APIs of SCEF 501a. The application may utilize UE usage type of the device 100a to add more NSIs to serve the device 100a and delete NSIs serving the device 100a through APIs of SCEF 501a. The application may utilize UE usage type of the device 100a to add and delete a virtual network function (VNF) to a NSI serving the device 100a through APIs of SCEF 501a, and thus modify virtual network function forwarding graph (VNFFG) and virtual link (VL).

6. Conclusion

In conclusion, an MTC device can operates as a regular MTC terminal or a MTC gateway device. The disclosed MTC gateway device is operable to provide usage type information to a 3GPP network entity and an application out of the 3GPP network. The disclosed MTC gateway device and base station provide an enhanced monitoring response to a monitoring request.

Exposure of usage type and subscription information associated with a user equipment (UE) device is a first step to virtual network function and network slice related provisioning and dedicated core network related provisioning for the UE device. Providing UE usage type through a network exposure function to a third party application enables the third party application to adapt for the usage type. For example, the third party application may create, add, and delete NSIs serving the UE device.

It is to be understood, however, that even though numerous characteristics and advantages of the disclosure have been set forth in the foregoing description, together with details of the structure and function of the present disclosure, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. An apparatus comprising:
a communication unit operable to transmit an announcement of an active operating state of the communication unit among a plurality of operating states through a wireless communication channel, wherein the plurality of operating states comprise a relay user equipment usage type and a regular user equipment usage type; and
a processor operable as a reporter operable to report the relay user equipment usage type as the active operating state associated with the communication unit in a condition that the communication unit operates as relay user equipment in the relay user equipment usage type; wherein the processor is operable to report a current serving cell ID associated with the communication unit in response to a serving cell ID announcement request in a condition that the communication unit operates as the relay user equipment in the relay user equipment usage type, and report an updated serving cell ID associated with the communication unit upon a mobility event of the communication unit in response to the serving cell ID announcement request in a condition that the communication unit operates as the relay user equipment in the relay user equipment usage type.

2. The apparatus as claimed in claim 1, wherein the user equipment usage type specifies whether a communication pattern associated with the user identifier belongs to one of human-to-human communication and machine-to-machine communication.

3. The apparatus as claimed in claim 2, wherein the user equipment usage type is exposed to an external application through a cellular network exposure function, and the external application is external to a cellular network associated with a subscriber related record.

4. The apparatus as claimed in claim 3, wherein the communication unit operable to receive a request for exposure of the subscriber related record associated with the user identifier from the cellular network exposure function; and the processor operable to receive modification of association between the subscriber related record and the user identifier;

wherein the processor causes exposure of the subscriber related record to the cellular network exposure function.

* * * * *